(12) United States Patent
Lee et al.

(10) Patent No.: US 12,541,919 B2
(45) Date of Patent: Feb. 3, 2026

(54) METHOD AND DEVICE WITH SYNTHETIC IMAGE GENERATION

(71) Applicant: Samsung Electronics Co., Ltd., Suwon-si (KR)

(72) Inventors: Seohyung Lee, Suwon-si (KR); Seongeun Kim, Suwon-si (KR); Kyuhyun Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 18/656,015

(22) Filed: May 6, 2024

(65) Prior Publication Data

US 2025/0173959 A1 May 29, 2025

(30) Foreign Application Priority Data

Nov. 24, 2023 (KR) .................. 10-2023-0165597

(51) Int. Cl.
*G06T 17/00* (2006.01)
*G06T 5/70* (2024.01)

(52) U.S. Cl.
CPC .............. *G06T 17/00* (2013.01); *G06T 5/70* (2024.01); *G06T 2200/04* (2013.01); *G06T 2207/10028* (2013.01); *G06T 2210/56* (2013.01)

(58) Field of Classification Search
CPC ....... G06T 17/00; G06T 5/70; G06T 2200/04; G06T 2207/10028; G06T 2210/56; G06T 5/77; G06T 5/60
See application file for complete search history.

(56) References Cited

U.S. PATENT DOCUMENTS

| 10,401,500 | B2 | 9/2019 | Yang et al. |
| 10,841,496 | B2 | 11/2020 | Wheeler et al. |
| 2019/0050983 | A1* | 2/2019 | Chen ................ G06T 7/11 |
| 2020/0286280 | A1* | 9/2020 | Agara Venkatesha Rao ........... G06T 17/00 |
| 2021/0118132 | A1* | 4/2021 | Kearney ............. G06N 3/0442 |
| 2021/0138655 | A1* | 5/2021 | Mousavian ........... B25J 9/1666 |

(Continued)

FOREIGN PATENT DOCUMENTS

| CN | 110400363 B | * 11/2019 | ............ G06T 11/60 |
| CN | 116312971 A | 6/2023 | |
| KR | 10-2001-0097331 A | 11/2001 | |

OTHER PUBLICATIONS

Luo S, Hu W. Diffusion probabilistic models for 3d point cloud generation. InProceedings of the IEEE/CVF conference on computer vision and pattern recognition 2021 (pp. 2837-2845).*

(Continued)

*Primary Examiner* — Sarah Lhymn
(74) *Attorney, Agent, or Firm* — NSIP Law

(57) ABSTRACT

A method and apparatus with synthetic image generation are provided. The method includes selecting, from a memory, a sample point cloud corresponding to an object; generating a generation-condition point cloud by combining the sample point cloud with a target point cloud; generating a masked input image by masking, in an input image, an object area corresponding to the sample point cloud; and generating an output image by inputting the masked input image and the generation-condition point cloud to a generative model which uses the generation-condition point cloud as a condition for generating the output image.

20 Claims, 10 Drawing Sheets

(56) References Cited

U.S. PATENT DOCUMENTS

| | | |
|---|---|---|
| 2022/0222922 A1* | 7/2022 | Zhu .................... G06V 10/764 |
| 2022/0300681 A1* | 9/2022 | Ren .................... G06V 10/23 |
| 2023/0181144 A1* | 6/2023 | Sun .................... A61B 6/0487 |
| | | 378/205 |
| 2025/0069228 A1* | 2/2025 | Ma .................... G06T 7/136 |

OTHER PUBLICATIONS

Zyrianov et al. "Learning to Generate Realistic LiDAR Point Clouds" *European Conference on Computer Vision.* Cham: Springer Nature Switzerland, 2022 (pp. 1-19).

Li et al. "DiffusionPointLabel: Annotated Point Cloud Generation with Diffusion Model" vol. 41 No. 7, 2022, *Computer Graphics Forum.* (pp. 1-9).

* cited by examiner

METHOD AND DEVICE WITH SYNTHETIC IMAGE GENERATION

CROSS-REFERENCE TO RELATED APPLICATIONS

This application claims the benefit under 35 USC § 119(a) of Korean Patent Application No. 10-2023-0165597, filed on Nov. 24, 2023, in the Korean Intellectual Property Office, the entire disclosure of which is incorporated herein by reference for all purposes.

BACKGROUND

1. Field

The following description relates a method and device with synthetic image generation, and more particularly, to a method of training, and performing inference with, a generative model that uses a point cloud to create a determined object in a determined position in a driving image.

2. Description of Related Art

Diffusion modelling is a technology that generates natural images from noise. Diffusion modelling is generally based on deep learning technology and in recent years has become popular in the field of synthetic image generation. A diffusion model is usually trained by (i) incrementally adding noise (usually a small amount) to an original image at each of T steps, (ii) generating a noise image that may appear indistinguishable from the original image, and then (ii) restoring the original image by incrementally removing noise during another T steps. A diffusion model trained in this way may, when performing inference to generate a new image, may remove noise from random Gaussian noise.

Recently, extensive research has been conducted on diffusion models. Most of the latest technologies of diffusion models deal specify a target domain by giving a condition to a diffusion model to specify how it is to generate a desired image. In the case of driving images, existing methods of applying a diffusion model to a driving image generally use a semantic map as an image generation condition. However, since a semantic map does not include three-dimensional (3D) information, existing methods generate images that appear unnatural, at least in terms of perspective, object orientation, and shape precision.

Inpainting can produce a natural result overall since inpainting generates an image of a masked area rather than an entire image. However, inpainting cannot produce 3D expression very well since only simple information such as text or a class is given as an image-generation condition for the inpainting.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image generation method includes: selecting, from a memory, a sample point cloud corresponding to an object; generating a generation-condition point cloud by combining the sample point cloud with a target point cloud; generating a masked input image by masking, in an input image, an object area corresponding to the sample point cloud; and generating an output image by inputting the masked input image and the generation-condition point cloud to a generative model which uses the generation-condition point cloud as a condition for generating the output image.

The generative model may include a diffusion model, and the generating of the output image may include: receiving the masked input image as an input to the diffusion model; and wherein the generation-condition point cloud functions as a condition according to which the diffusion model generates the output image.

The generating of the output image may further include: performing denoising operations through the diffusion model.

The performing of the denoising operations may include: combining the masked input image with a noise image corresponding to a denoising operation; and performing the denoising operation by using the generation-condition point cloud as a condition of the denoising.

The memory may be configured to: store sample point clouds of respective classes of objects, and the sample point cloud may be selected from among the sample point clouds based on the class thereof.

The generating of the generation-condition point cloud may include: obtaining a position, in the target point cloud, in which the sample point cloud is to be combined with the target point cloud; and combining the sample point cloud with the target point cloud based on the position.

The generating of the generation-condition point cloud may include: projecting the combined point cloud to image coordinates.

The generating of the generation-condition point cloud may include: projecting the combined point cloud to the image coordinates.

The processing of the combined point cloud may include: converting the combined point cloud as projected to the image coordinates into a three-dimensional (3D) representation.

The 3D representation may include a voxel model or a mesh model.

The generating of the generation-condition point cloud may further include: embedding the combined point cloud as projected to the image coordinates.

The memory may include multiple stored sample point clouds of an object class of an object in the input image, and each stored sample point cloud may have a position associated therewith, and wherein the method may further include selecting the sample point cloud from among multiple stored sample point clouds based on the position associated with the sample point cloud.

In another general aspect, an image generation device includes: one or more processors; and storage storing a sample point cloud corresponding to an object, where the object is depicted in an input image; a memory storing instructions configured to cause the one or more processors to: obtain the sample point cloud from the storage; generate a generation-condition point cloud by combining the sample point cloud with a target point cloud that is paired with the input image; generate a masked input image by masking, in the input image, an area of the object that corresponds to the sample point cloud; and generate an output image by inputting the masked input image and the generation-condition point cloud to a generative model which uses the generation-condition point cloud as a condition for generating the output image.

The generative model may include a diffusion model, and the instructions may be further configured to cause the one or more processors to: receive the masked input image as an input to the diffusion model; and receive the generation-condition point cloud as a condition according to which the diffusion model generates the output image.

The instructions may be further configured to cause the one or more processors to: perform denoising operations on the masked input image through the diffusion model.

The instructions may be further configured to cause the one or more processors to: combine the masked input image with a noise image corresponding to a denoising operation performed by the generative model on the masked input image; and perform the denoising operation by using the generation-condition point cloud as a condition of the denoising.

The storage may store indications of object classes, including an indication of a class of the object, and store, for each indicated object class: sample point clouds and respective orientations or positions thereof.

The instructions may be further configured to cause the one or more processors to: obtain a position or orientation, in the target point cloud, in which the sample point cloud is to be combined with the target point cloud; select the sample point cloud from among the point clouds that the storage stores for the object class of the object, wherein the sample point cloud is selected on determining that its position or orientation corresponds to the obtained position or orientation in the target point cloud; and combine the selected sample point cloud with the target point cloud based on the obtained position or orientation in the target point cloud and based on the indication of the object class of the object.

The instructions may be further configured to cause the one or more processors to: project the combined point cloud, which includes the target point cloud as combined with the sample point cloud, to image coordinates; and generate the output image by the generative model processing the point cloud projected to the image coordinates.

An embedding of the projected combined point cloud may be inputted to generative model.

Other features and aspects will be apparent from the following detailed description, the drawings, and the claims.

Figure 1:
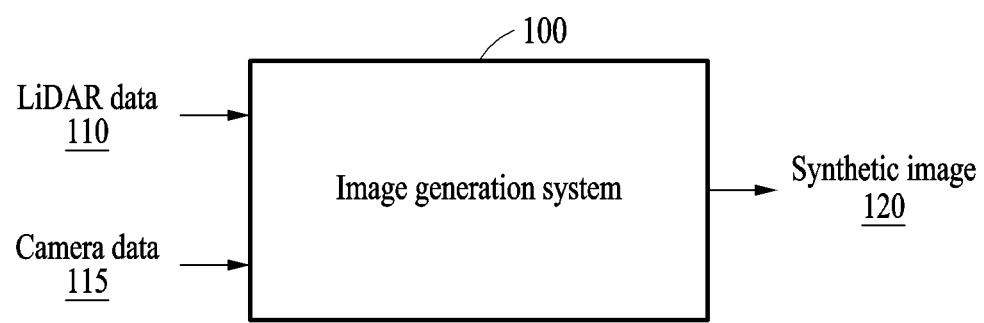
FIG. 1 illustrates an example image generation system, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example image generation system, according to one or more embodiments.

Referring to FIG. 1, an image generation system 100 may generate a synthetic image using multimodal data (image data and point cloud data). For example, the image generation system 100 may generate a synthetic image using driving data obtained from sensors of a vehicle. For example, the image generation system 100 may generate a synthetic image 120 that may be used in the field of autonomous driving detection. The image generation system 100 may generate the synthetic image 120 using driving data consisting of light detection and ranging (LiDAR) data 110 paired with camera data 115. The LiDAR data 110 may be data collected from a LiDAR sensor and may refer to a set cloud of multiple points spread out in a three-dimensional (3D) space. Although LiDAR point cloud data is referenced herein, the point cloud may have any genesis, for example, from a RADAR sensor, from another model, etc. In addition, the driving point cloud and the driving image, paired, may correspond to a driving scent at a same time.

The image generation system 100 may perform object-centric image manipulation, modification, etc., and particularly, may generate a natural-appearing image by utilizing accurate 3D information of an object. Object-centered image manipulation or modification refers to manipulating or modifying the image on an object-by-object basis, such as by inserting a new object into the image or changing the shape of an object included in the image. For example, the image generation system 100 may perform image inpainting. Image inpainting is a type of digital image processing technique that may restore damaged areas of an image or fill in deleted parts. In relation to inpainting, masking may cause the inpainting to occur only (or mostly) at the area of the object (masking is a process that may be used to identify the specific area where image processing will be performed by inpainting). In embodiments described herein, a synthetic image may be/include augmented 2D data of an object.

As described in detail below, the image generation system 100 may generate the synthetic image 120 based on a generative model. The generative model may be a neural network (NN) model that analyzes and learns existing data to become able to generate new data. The generative model may also be referred to as an image generation model.

The image generation system 100 may use a diffusion model as the generative model. For example, the image generation system 100 may perform inpainting in a way that maintains the appearance of a 3D shape of a desired object, despite the inpainting from using a diffusion model that is trained using LiDAR point clouds as an image-generation condition (a condition that influences the image generation). That is to say, in the inference operation of the image generation system 100, a composite image may be an image in which an image of a new object is added to the input image. In other words, "target object" may refer to a new object to be synthesized, and by using the point cloud information of the new object as input data of the image generation system 100, a synthetic image that reflects the three-dimensional appearance of the object can be generated.

The generative model used in the image generation system 100 is not limited to a diffusion model. For example, the image generation system 100 may use various types of generative models such as a Variational autoencoder (VAE), generative adversarial neural network (GAN), generative adversarial network (GAN), Autoregressive Model, and the like. In view of the examples of models mentioned and described herein, general operation of a NN model is described next with reference to FIGS. 2A and 2B.

Figure 2A:
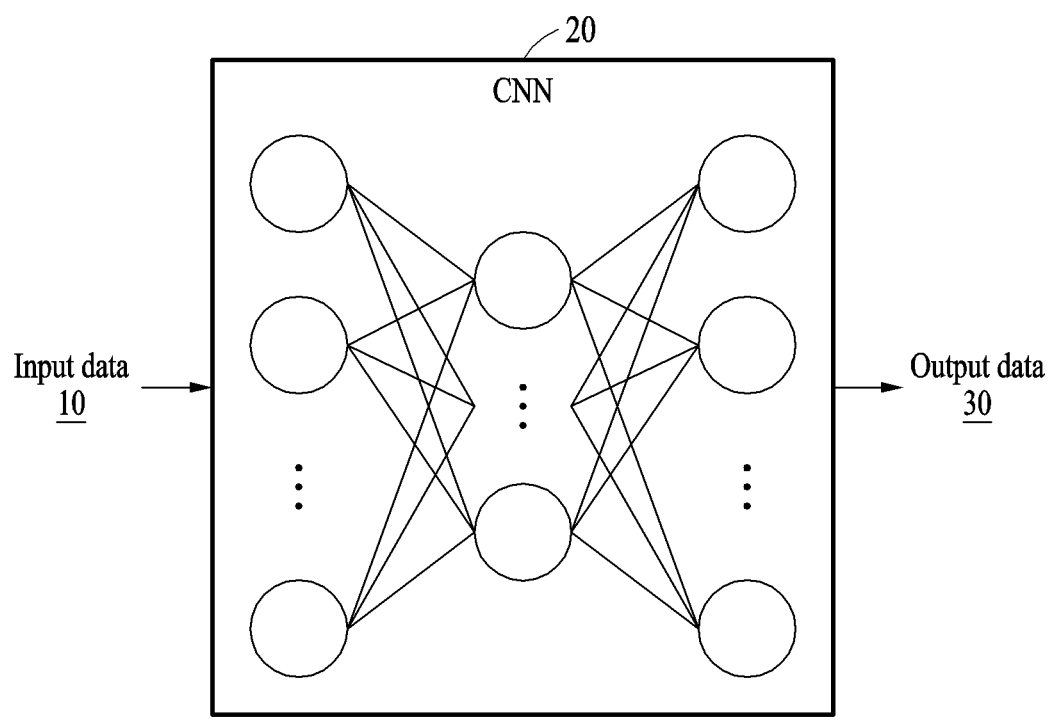
FIG. 2A illustrates an example deep learning operation method using a neural network (NN), according to one or more embodiments.

FIG. 2A illustrates an example of a deep learning operation method using a NN, according to one or more embodiments.

An artificial intelligence (AI) algorithm including deep learning or the like may input input data 10 to a NN 20 and learn output data 30 through an operation such as convolution. The NN 20 may be a computational network architecture formed of layers of nodes, where there are connections between the nodes. Nodes in one layer may have connections with nodes in an adjacent, and the connection may have respective weights that can be set by training and then control how the NN 20 performs an inference. The NN 20 may include an input layer to receive the input data 10. Subsequent layers (e.g., layers) may transform the input data 10 as it flows through the NN 20 until an output layer outputs the output data 30. The NN 20 may have different network architectures, for example, a convolutional neural network (CNN), a recurrent neural network (RNN), a deep belief network (DBN), and a restricted Boltzmann machine (RBM) model, which are non-limiting examples. In a feed-forward NN, nodes have connections to other nodes. The connections may flow in one direction, for example, a forward direction (from input layer to output layer), through the NN.

FIG. 2A illustrates a structure in which the input data 10 is input to the NN 20 (e.g., a CNN) including one or more layers and the output data 30 is output through an output layer of the NN 20. As noted, the NN 20 may be a deep neural network including at least two layers.

In the case of the NN 20 being a CNN, the CNN may be used to extract features such as a border, a line color, and the like, from the input data 10. The CNN may include a multiple layers. Each of the layers may receive data, process data input thereto, and output data therefrom. The data output from a layer may be a feature map generated by performing a convolution operation on an image or a feature map that is input to the CNN with weight values of at least one filter. Initial layers of the CNN may operate to extract features of a low level, such as edges or gradients, from an input. Subsequent layers of the CNN 20 may gradually extract more complex features such as the eyes and nose in an image. A final portion (e.g., fully connected layer(s))

might infer classes or other traits from the output of the convolutional layers, depending on the configuration of the CNN.

Figure 2B:
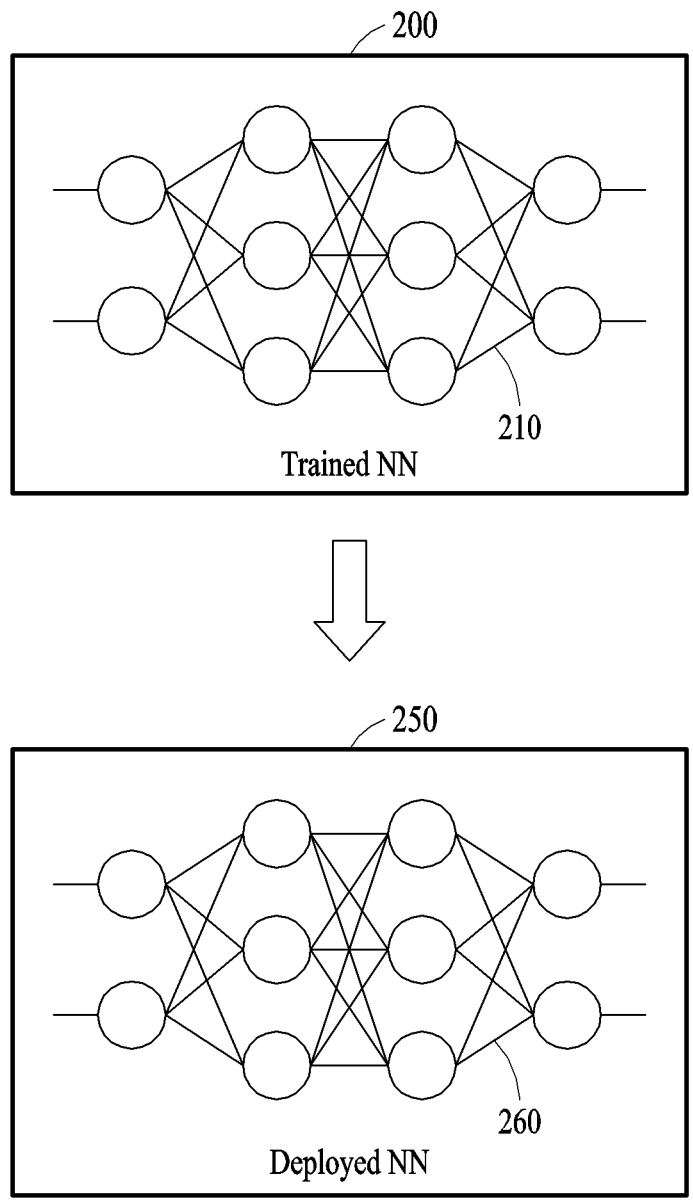
FIG. 2B illustrates an example training and inference method of a NN model, according to one or more embodiments.

FIG. 2B illustrates an example training and inference method of a NN model, according to one or more embodiments.

Referring to FIG. 2B, the image generation system 100 may be/include a training device 200 and an inference device 250 (which may be same or individual devices). The training device 200 may correspond to a computing device having various processing functions such as generating a neural network, training (or learning) a neural network, or retraining a neural network. For example, the training device 200 may be implemented as various types of devices such as a PC, a server device, a mobile device, and the like.

The training device 200 may generate at least one trained neural network 210 by repetitively training (or learning) a given initial neural network. The generating of the at least one trained neural network 210 may involve determining neural network parameters. The neural network parameters may include various types of data, for example, input/output activations, weights, and biases of a neural network that are updated in the neural network during training thereof, for example by backpropagation or other loss-reduction methods. When the neural network 210 is repeatedly trained, the parameters of the neural network 210 may be tuned to calculate a more accurate output for a given input.

The training device 200 may transmit the at least one trained neural network 210 to the inference device 250. The inference device 250 may be, for example, a mobile device, an embedded device, a control system of a vehicle, or others. The inference device 250 may be dedicated hardware for driving a neural network and may be an electronic device including at least one of a processor, memory, an input/output (I/O) interface, a display, a communication interface, or a sensor. The inference device 250 may also be referred to as an electronic device, image generation device, etc.

The inference device 250 may be any digital device that includes a memory element and a microprocessor and has an operational capability, such as a tablet PC, a smartphone, a PC (e.g., a notebook computer), an AI speaker, a smart TV, a mobile phone, a navigation, a web pad, a personal digital assistant (PDA), a workstation, and the like.

The inference device 250 may drive the at least one trained neural network 210 without a change thereto or may drive a neural network 260 obtained by processing (for example, quantizing) the at least one trained neural network 210. The inference device 250 for driving the neural network 260 may be implemented in a separate device, independent of the training device 200. However, examples are not limited thereto. The inference device 250 may also be implemented in (or may be) the same device as the training device 200.

Figure 3:
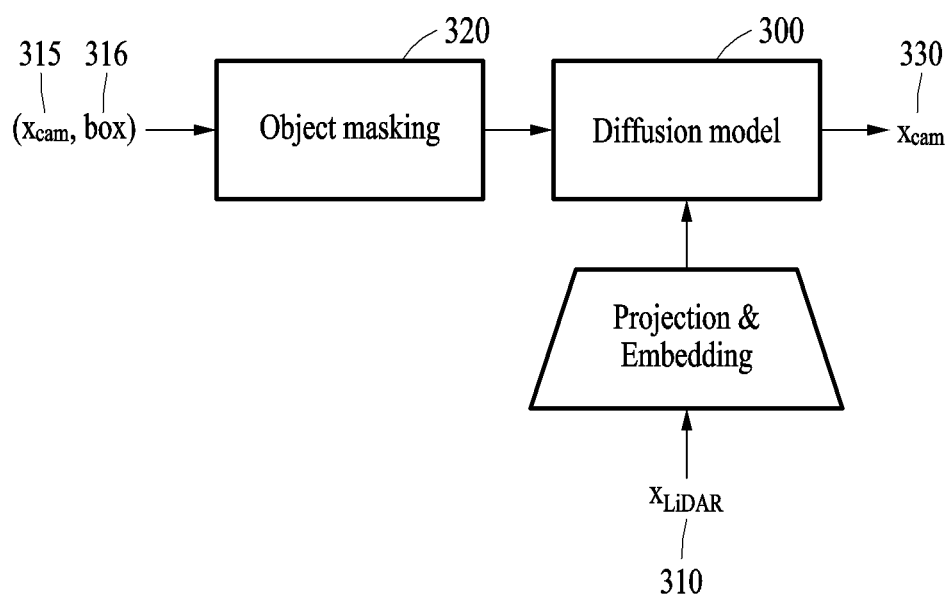
FIG. 3 illustrates an example method of training an image generation model, according to one or more embodiments.

FIG. 3 illustrates an example method of training an image generation model, according to one or more embodiments. The description provided with reference to FIGS. 1 to 2B is generally applicable to FIG. 3.

As an overview, for training or non-training inference, the diffusion model 300 is a neural network model configured to generate synthetic images based on an image and an input point cloud paired with the input image. The synthesis of an image may involve masking an area to be inpainted. The input point cloud point (as projected and embedded) may serve as a generation-condition that informs the synthesis of an output image for the input image.

Referring to FIG. 3, where "x" represents input data, the training device 200 may learn/train a diffusion model 300 using driving data consisting of LiDAR data $x_{LiDAR}$ 310 paired with camera data $x_{cam}$ 315. As described above, the LiDAR data $x_{LiDAR}$ 310 may be LiDAR point cloud data (a cloud of 3D points) of a scene obtained using a LiDAR sensor, and the camera data $x_{cam}$ 315 may be image data of the scene obtained using a camera; the LiDAR and camera may be components installed to a vehicle.

The training device 200 may learn/train a process of masking 320 an object (specifically, learning the diffusion model 300), which may be learned from the camera data $x_{cam}$ 315 by using both the camera data $x_{cam}$ 315 and ground truth box information 316. The training device 200 may restore an original image 330 through the diffusion model 300. The training device 200 may learn/train the diffusion model 300 so that the training device 200 may become able to generate image data of an object (e.g., for inpainting) corresponding to the LiDAR data $x_{LiDAR}$ 310, where the generating of the image data of the object is performed using the LiDAR data $x_{LiDAR}$ 310 corresponding to the camera data $x_{cam}$ 315 as a generation-condition of the diffusion model 300.

The training device 200 may spatially align the LiDAR data $x_{LiDAR}$ 310 with the camera data $x_{cam}$ 315 in order to use the LiDAR data $x_{LiDAR}$ 310 as a generation-condition of the diffusion model 300. Regarding how the spatial aligning is performed, the camera data paired with the lidar data (included in the data for training) may contain the camera's pose information, thus enabling alignment. A method of spatially aligning the LiDAR data $x_{LiDAR}$ 310 with the camera data $x_{cam}$ 315 is described with reference to FIGS. 5A and 5B.

Figure 4:
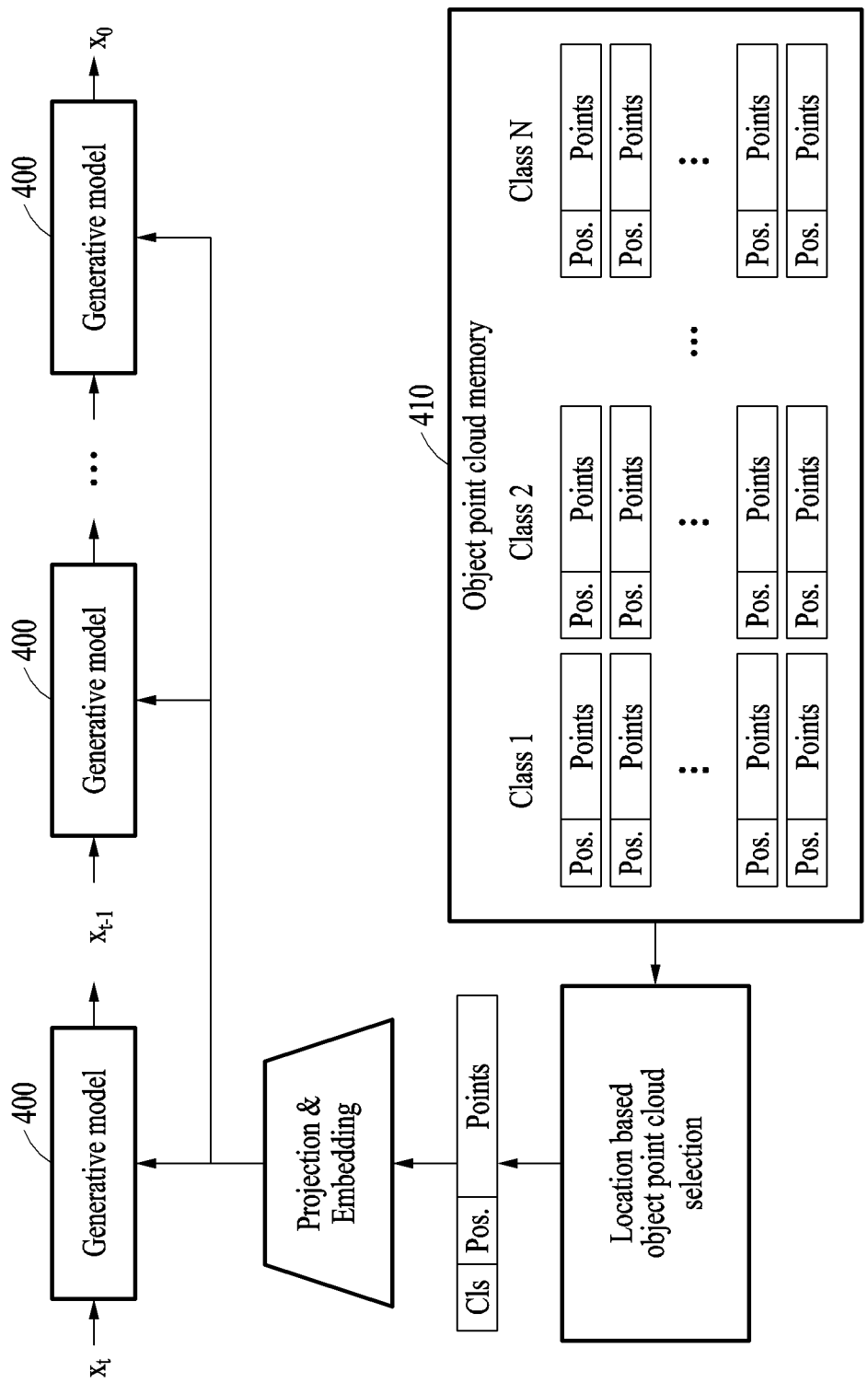
FIG. 4 illustrates an example image generation method, according to one or more embodiments.

FIG. 4 illustrates an example of an image generation method, according to one or more embodiments. The description provided with reference to FIGS. 1 to 3 is generally applicable to FIG. 4.

Referring to FIG. 4, the inference device 250 may perform object inpainting utilizing a learned generative model 400 and an object point cloud memory. Here, object inpainting refers to inpainting directed to a masked object of interest, for which a 3D point cloud is used to improve the inpainting.

The inference device 250 may build an object point cloud memory 410 in advance. As described next, the object point cloud memory 410 may be used to provide data that is used by the learned generative model 400 to help generate or manipulate an image. More specifically, the inference device 250 may crop (copy) a bounding box area of an object from the LiDAR point cloud data in advance and store the cropped bounding box area of the object in the object point cloud memory 410. This may be done in advance for many objects of different classes and each with different poses for the classes, all of which may be stored into the object point cloud memory 410. For example, the inference device 250 may crop a point cloud corresponding to all objects from the LiDAR data $x_{LiDAR}$ 310 and the ground truth box information 316 and may store the cropped point cloud (i.e., copy the point cloud data in the ground truth box) in the object point cloud memory 410 along with position/pose information of the cropped point cloud (e.g., in the form of ground truth box).

Regarding what may be stored in the memory 410, the cropped data may be obtained by cropping the bounding box area in the point cloud. The "position" of an object stored in cloud memory may refer to the pose of the object.

A 3D perception public dataset (e.g., nuScenes) may have a class imbalance problem. That is, some object classes may have more instances of 3D cloud/model data thereof. When the performances of different cognitive models are compared for each class, the performance is proportional to the number of instances of data provided for each class. Object classes with more instances may perform better. Thus, in order to solve the class imbalance problem of the inference device 250, the object point cloud memory 410 may store, for multiple object classes, multiple respective instances of sample point clouds of the corresponding object class. For example, an object class may be a class of any object that might be used in autonomous driving, such as a car class, a sign class, and the like.

The inference device 250 may obtain, from the memory or the input point cloud, point cloud information, position information, and size information of a desired object. The desired object may be an object to be synthesized anew (i.e., as new image information for the final synthetic image), and a point cloud of the desired object may be referred to as a sample point cloud.

The inference device 250 may generate a generation-condition LiDAR point cloud by combining a sample point cloud (of a desired object) with a target/input LiDAR point cloud to generate a generation-condition lidar point cloud that includes the target/input point cloud but with a portion corresponding to the desired object replaced by the desired object's sample point cloud obtained from the object point cloud memory 410. The target LiDAR point cloud may correspond to an input image (e.g., $x_t$) that is input to the generative model 400.

The inference device 250 may project a LiDAR point cloud, which is a combination of the input LiDAR point cloud and the object point cloud, to image coordinates. Furthermore, the inference device 250 may embed the combination LiDAR point cloud as projected to the image coordinates. The inference device 250 may use the embedded LiDAR point cloud as a generation-condition of the generative model 400 when generating a synthetic image (e.g., $x_0$) for the input image.

The inference device 250 may generate a masked input image by masking, in an input image $x_t$, an object area corresponding to the sample point. More specifically, the inference device 250 may mask an area of the input image $x_t$, to which the sample point cloud is projected to image coordinates (e.g., projecting the 3D point cloud to a 2D image space).

The inference device 250 may input the masked input image to the generative model 400 and iteratively perform denoising over repeated steps using the generative model 400. The inference device 250 may generate a desired image (output image $x_0$) by adding random noise to a generated input image and through denoising using (based on) a generation-condition (in the form of the combined point cloud); random noise may be imposed on the masked data, and this may be performed at the beginning of the inference operation.

For example, the generative model 400 may generate intermediate image/result $x_{t-1}$ by denoising the input image $x_t$ in a first step and may generate $x_{t-2}$ by denoising $x_{t-1}$ in a second step. The generative model 400 may generate an output image $x_0$ by repeating the above steps. Since the generative model 400 uses the embedded LiDAR point cloud, which is 3D information, as a generation-condition, the inference device 250 may perform inpainting while maintaining a 3D shape of the desired object.

Figure 5A:
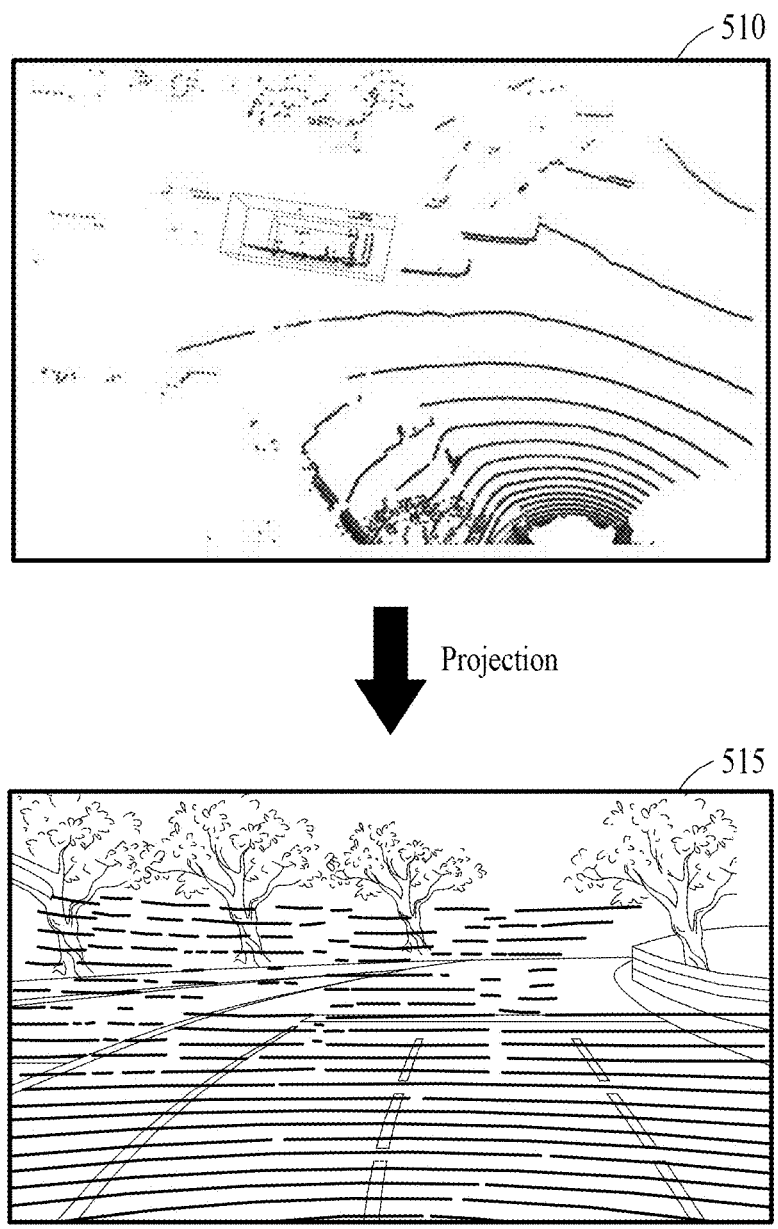
FIGS. 5A and 5B illustrate an example method of spatially aligning light detection and ranging (LiDAR) data with camera data, according to one or more embodiments.
Figure 5B:
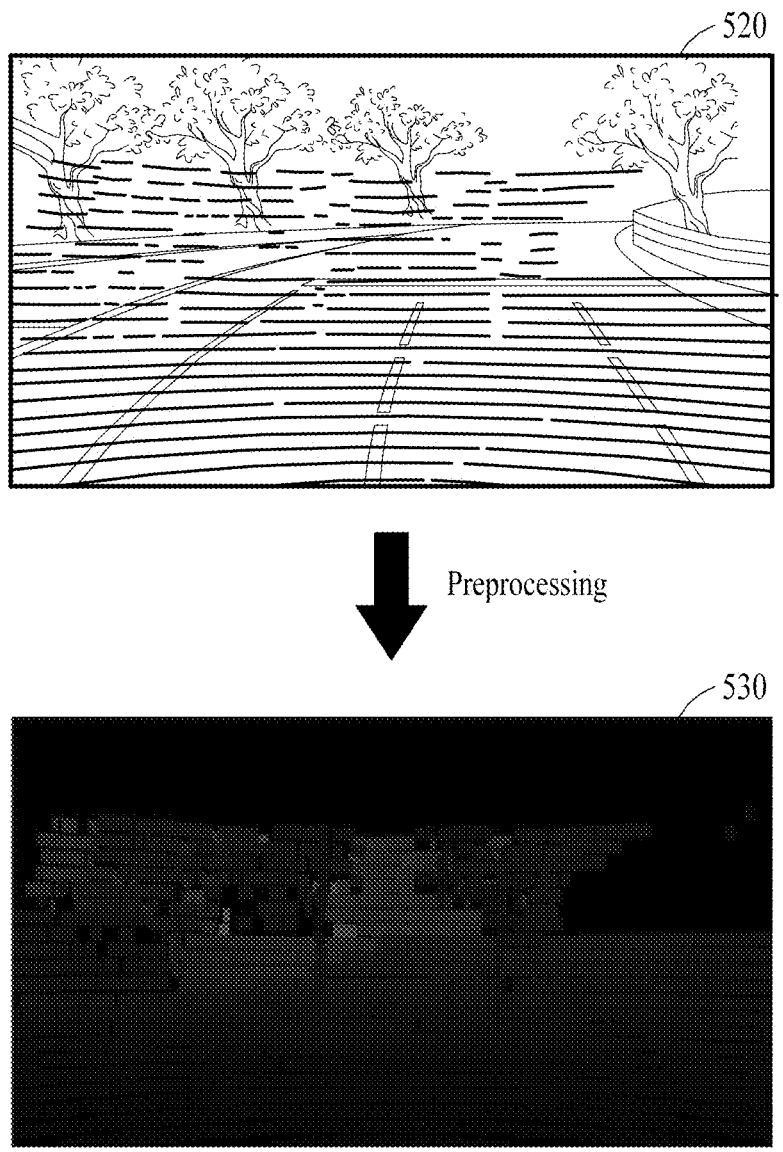

FIGS. 5A and 5B illustrate an example of a method of spatially aligning LiDAR (point cloud) data with camera data, according to one or more embodiments. The description provided with reference to FIGS. 1 to 4 is generally applicable to FIGS. 5A and 5B.

Referring to FIG. 5A, in order to use LiDAR data as a generation-condition of a diffusion model, the LiDAR data may be spatially aligned with the camera data, as described above.

The inference device 250 may project a LiDAR point cloud 510 combined with a sample point 515 to image coordinates. In the case of the LiDAR point cloud 520 projected to image coordinates, a sparse point cloud may exist.

Referring to FIG. 5B, the inference device 250 may process the sparse point cloud of the LiDAR point cloud 520 projected to image coordinates (e.g., may project the point cloud into two dimensions onto the image such that scene features in the image and in the point cloud align). For example, the inference device 250 may convert a LiDAR point cloud projected to the image coordinates into a 3D representation or model. For example, the inference device 250 may convert the LiDAR point cloud (as projected to the image coordinates) into at least one form of voxels or 3D mesh model.

The inference device 250 may embed the LiDAR point cloud 520 projected to the image coordinates or a converted LiDAR point cloud 530 as image coordinates. For example, the inference device 250 may input the LiDAR point cloud 520 projected to the image coordinates or the converted LiDAR point cloud 530 to a NN model (e.g., a CNN model) to extract an embedding vector. The inference device 250 may use an extracted embedding vector as a generation-condition of a generative model.

Figure 6:
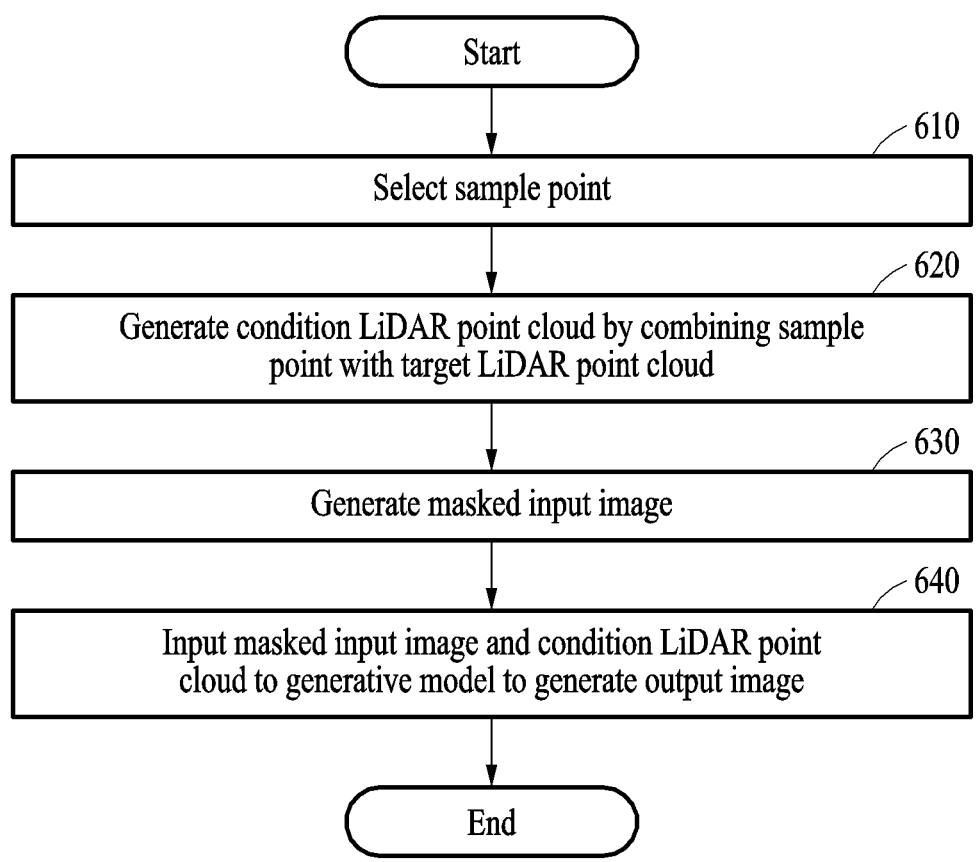
FIG. 6 illustrates an example image generation method, according to one or more embodiments.

FIG. 6 illustrates an example image generation method, according to one or more embodiments. The description provided with reference to FIGS. 1 to 5B is generally applicable to FIG. 6.

Although operations 610 to 640 are described as performed using the inference device 250 shown in FIG. 2B, these operations may be performed by another suitable electronic device in a suitable system.

In operation 610, the inference device 250 may select, from a memory (e.g., the object point cloud memory 410), a sample point cloud that is a LiDAR point cloud corresponding to an object.

In operation 620, the inference device 250 may generate a generation-condition LiDAR point cloud by combining the sample point cloud with a target/input LiDAR point cloud. The sample point cloud may be obtained based on matching a class of the object of interest (e.g., as identified in the input image). In addition, among the sample point clouds of the matching class, a sample point cloud having a pose (and/or position or the like) matching the location/position of the object in the input point cloud may be selected/obtained. The selected sample point cloud (e.g., selected according to the object position in the target LiDAR point cloud) may be combined with the target LiDAR point cloud based on (e.g., at) the position in the target LiDAR point cloud, thus forming a combined target LiDAR point cloud. The inference device 250 may project the combined LiDAR point cloud (combined with the sample point cloud) to image coordinates.

In operation 630, the inference device 250 may generate a masked input image by masking, in an input image, an object area corresponding to the sample point cloud.

In operation 640, the inference device 250 may input the masked input image and the generation condition LiDAR point cloud (in whatever form) to a generative model to generate an output image.

The generative model may include a diffusion model, and the inference device 250 may receive the masked input image as an input to the diffusion model and may receive a generation-condition LiDAR point cloud as a condition according to which the diffusion model will generate the output synthetic image.

The inference device 250 may iteratively perform denoising operations through the diffusion model. The inference device 250 may combine the masked input image with a noise image corresponding to the corresponding denoising operation and may perform the corresponding denoising operation using the condition LiDAR point cloud as a condition.

Figure 7:
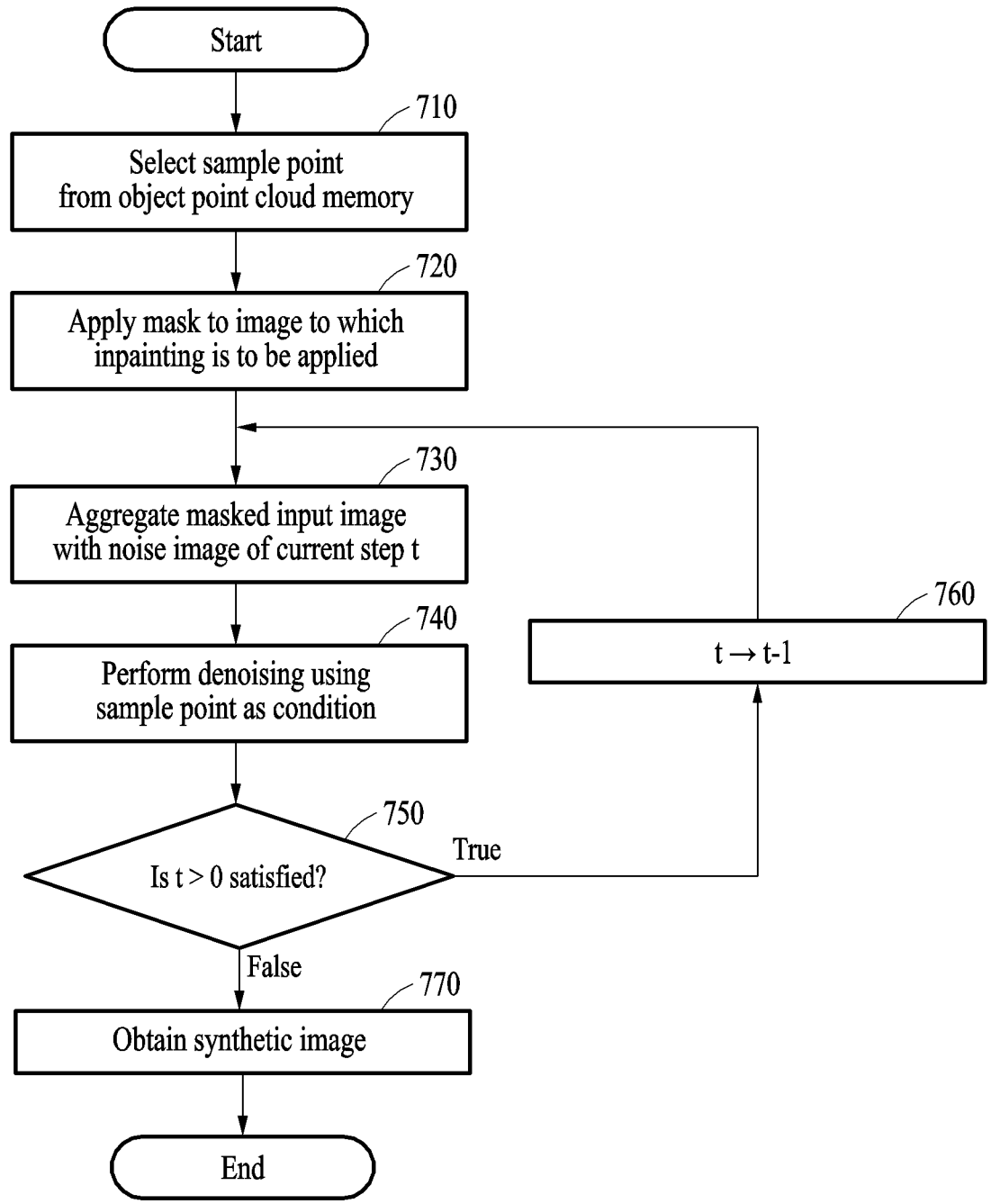
FIG. 7 illustrates an example image generation method, according to one or more embodiments.

FIG. 7 illustrates a flowchart of an example of an image generation method, according to one or more embodiments. The description provided with reference to FIGS. 1 to 6 is generally applicable to FIG. 7.

Operations 710 to 770 may be performed using the inference device 250 or by another suitable electronic device in a suitable system.

In operation 710, the inference device 250 may select a sample point cloud from an object point cloud memory.

In operation 720, the inference device 250 may apply a mask to an image (an input image) to which inpainting is to be applied. The inference device 250 may generate a masked input image by masking, in the input image, an object area corresponding to the sample point cloud.

In operation 730, the inference device 250 may aggregate the masked input image with the noise image of the current step t.

In operation 740, the inference device 250 may perform denoising using the sample point cloud as a generation-condition.

In operation 750, the inference device 250 may compare the current step t to 0 and, when the current step t is greater than 0, may lower the current step by one step in operation 760.

The inference device 250 may repeat operations 730 to 760 until the current step is 0, and finally, in operation 770, obtain a synthetic image, which is an output image at t=0.

Figure 8:
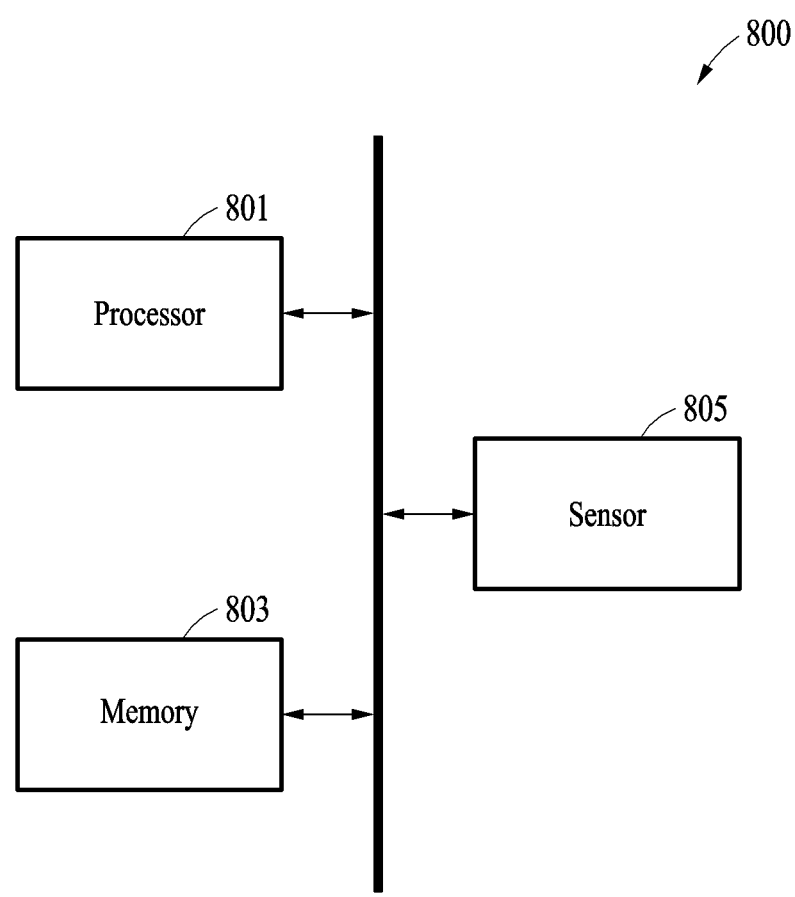
FIG. 8 illustrates an example configuration of an electronic device, according to one or more embodiments.

FIG. 8 illustrates an example configuration of an electronic device, according to one or more embodiments.

Referring to FIG. 8, an electronic device 800 may include a processor 801, a memory 803, and a sensor 805. The electronic device 800 may be the inference device 250 described with reference to FIGS. 1 to 7.

The processor 801 may perform at least one of the operations described with reference to FIGS. 1 to 7. The processor 801 may obtain a sample point cloud from the memory 803, generate a generation-condition LiDAR point cloud by combining the sample point with a target LiDAR point cloud, generate a masked input image by masking, in an input image, an area of an object corresponding to the sample point cloud, and generate an output image by inputting the masked input image and the generation-condition LiDAR point cloud to a generative model. As mentioned above "LiDAR point cloud" is an example type of point cloud; a point cloud of any source may be used.

The memory 803 may be a volatile memory or a non-volatile memory (but not a signal per se) and may include an object point cloud memory that stores a sample point cloud that is a LiDAR point cloud corresponding to an object.

The sensor 805 may include a LiDAR sensor, a camera, and the like. The electronic device 800 may further include other components not shown in the drawings. For example, the electronic device 800 may further include a communication module and an I/O interface including an input device and an output device as the means of interfacing with the communication module. In addition, for example, the electronic device 800 may further include other components such as a transceiver, various sensors, and a database.

The computing apparatuses, the electronic devices, the processors, the memories, the image sensors, the displays, the information output system and hardware, the storage devices, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An image generation method performed by one or more processors and comprising:
   selecting, from a memory, a sample point cloud corresponding to an object;
   generating a generation-condition point cloud by combining the sample point cloud with a target point cloud;
   generating a masked input image by masking, in an input image, an object area corresponding to the sample point cloud; and
   generating an output image by inputting the masked input image and the generation-condition point cloud to a generative model which uses the generation-condition point cloud as a condition for generating the output image.

2. The image generation method of claim 1, wherein
   the generative model comprises a diffusion model, and
   the generating of the output image comprises:
   receiving the masked input image as an input to the diffusion model; and
   wherein the generation-condition point cloud functions as a condition according to which the diffusion model generates the output image.

3. The image generation method of claim 2, wherein the generating of the output image further comprises:
   performing denoising operations through the diffusion model.

4. The image generation method of claim 3, wherein the performing of the denoising operations comprises:
   combining the masked input image with a noise image corresponding to a denoising operation; and
   performing the denoising operation by using the generation-condition point cloud as a condition of the denoising.

5. The image generation method of claim 1, wherein the memory is configured to:
   store sample point clouds of respective classes of objects, the sample point cloud selected from among the sample point clouds based on the class thereof.

6. The image generation method of claim 1, wherein the generating of the generation-condition point cloud comprises:
   obtaining a position, in the target point cloud, in which the sample point cloud is to be combined with the target point cloud; and
   combining the sample point cloud with the target point cloud based on the position.

7. The image generation method of claim 1, wherein the generating of the generation-condition point cloud comprises:
   projecting the combined point cloud to image coordinates.

8. The image generation method of claim 7, wherein the generating of the generation-condition point cloud comprises:
projecting the combined point cloud to the image coordinates.

9. The image generation method of claim 8, wherein the processing of the combined point cloud comprises:
converting the combined point cloud as projected to the image coordinates into a three-dimensional (3D) representation.

10. The image generation method of claim 9, wherein the 3D representation comprises a voxel model or a mesh model.

11. The image generation method of claim 7, wherein the generating of the generation-condition point cloud further comprises:
embedding the combined point cloud as projected to the image coordinates.

12. A non-transitory computer-readable storage medium storing instructions that, when executed by the one or more processors, cause the one or more processors to perform the method of claim 1.

13. An image generation device comprising:
one or more processors; and
storage storing a sample point cloud corresponding to an object, where the object is depicted in an input image;
a memory storing instructions configured to cause the one or more processors to:
obtain the sample point cloud from the storage;
generate a generation-condition point cloud by combining the sample point cloud with a target point cloud that is paired with the input image;
generate a masked input image by masking, in the input image, an area of the object that corresponds to the sample point cloud; and
generate an output image by inputting the masked input image and the generation-condition point cloud to a generative model which uses the generation-condition point cloud as a condition for generating the output image.

14. The image generation device of claim 13, wherein the generative model comprises a diffusion model, and the instructions are further configured to cause the one or more processors to:
receive the masked input image as an input to the diffusion model; and
receive the generation-condition point cloud as a condition according to which the diffusion model generates the output image.

15. The image generation device of claim 14, wherein the instructions are further configured to cause the one or more processors to:
perform denoising operations on the masked input image through the diffusion model.

16. The image generation device of claim 15, wherein the instructions are further configured to cause the one or more processors to:
combine the masked input image with a noise image corresponding to a denoising operation performed by the generative model on the masked input image; and
perform the denoising operation by using the generation-condition point cloud as a condition of the denoising.

17. The image generation device of claim 13, wherein the storage stores indications of object classes, including an indication of a class of the object, and store, for each indicated object class:
sample point clouds and respective orientations or positions thereof.

18. The image generation device of claim 17, wherein the instructions are further configured to cause the one or more processors to:
obtain a position or orientation, in the target point cloud, in which the sample point cloud is to be combined with the target point cloud;
select the sample point cloud from among the point clouds that the storage stores for the object class of the object, wherein the sample point cloud is selected on determining that its position or orientation corresponds to the obtained position or orientation in the target point cloud and based on the indication of the object class of the object; and
combine the selected sample point cloud with the target point cloud based on the obtained position or orientation in the target point cloud.

19. The image generation device of claim 13, wherein the instructions are further configured to cause the one or more processors to:
project the combined point cloud, which comprises the target point cloud as combined with the sample point cloud, to image coordinates; and
generate the output image by the generative model processing the point cloud projected to the image coordinates.

20. The image generation device of claim 19, wherein an embedding of the projected combined point cloud is inputted to generative model.

* * * * *